(12) United States Patent
Tsuge et al.

(10) Patent No.: US 7,549,207 B2
(45) Date of Patent: Jun. 23, 2009

(54) METHOD OF MANUFACTURING AN ACTUATOR

(75) Inventors: Shigeto Tsuge, Okazaki (JP); Yasuo Kato, Niwa-gun (JP)

(73) Assignee: Denso Corporation, Kariya (JP)

( * ) Notice: Subject to any disclaimer, the term of this patent is extended or adjusted under 35 U.S.C. 154(b) by 357 days.

(21) Appl. No.: 11/290,821

(22) Filed: Dec. 1, 2005

(65) Prior Publication Data

US 2006/0117553 A1   Jun. 8, 2006

(30) Foreign Application Priority Data

Dec. 1, 2004   (JP)   ............................. 2004-348200

(51) Int. Cl.
*H02K 15/00*   (2006.01)

(52) U.S. Cl. ........................... 29/596; 29/602.1; 29/606; 29/611; 29/848; 123/516; 123/518; 123/520; 264/272.19; 264/328.2; 264/328.11; 425/144; 425/550; 425/556; 425/568; 425/575; 425/585

(58) Field of Classification Search .................... 29/596, 29/602.1, 606, 611, 848; 123/516, 518, 520; 264/272.19, 328.2, 328.11; 425/144, 550, 425/556, 568, 575, 585

See application file for complete search history.

(56) References Cited

U.S. PATENT DOCUMENTS

| 5,018,962 | A | * | 5/1991 | Kitamura et al. ............. 425/556 |
| 5,226,397 | A | * | 7/1993 | Zabeck et al. ............... 123/516 |
| 6,526,951 | B2 | * | 3/2003 | Ishigaki et al. .............. 123/519 |

FOREIGN PATENT DOCUMENTS

JP   2002-327856   11/2002

* cited by examiner

*Primary Examiner*—Thiem Phan
(74) *Attorney, Agent, or Firm*—Nixon & Vanderhye, PC

(57) ABSTRACT

A manufacturing method for an actuator including a casing and a housing. The method includes setting a metallic ring in a molding die; injection molding a first flange portion of the casing using one annular hooking piece of the metallic ring as a part of a surface of the molding die so as to outsert-mold the metallic ring on a molded surface of the first flange portion, the molded surface being opposite to a first connecting end surface of the first flange portion; engaging the first flange portion with a second flange portion of the housing so as to be opposed to each other; and applying force to bend the metallic ring to form an other annular hooking piece, thereby crimping and fixing the first connecting end surface of the casing with a second connecting end surface of the housing.

11 Claims, 5 Drawing Sheets

METHOD OF MANUFACTURING AN ACTUATOR

CROSS REFERENCE TO RELATED APPLICATIONS

This application is based on and incorporates herein by reference Japanese Patent Application No. 2004-348200 filed on Dec. 1, 2004.

FIELD OF THE INVENTION

The present invention relates to a manufacturing method for a connecting structure, in which a housing is connected with a resinous casing. In particular, the present invention relates to a manufacturing method for an actuator using the connecting structure.

BACKGROUND OF THE INVENTION

A solenoid valve according to JP-A-2002-327856 includes a solenoid actuator and a valve portion. The solenoid actuator includes a solenoid coil, which is supplied with electricity to generate attractive force in accordance with the electricity, thereby attracting a plunger toward an attracting portion in a stator core, so that a shaft integrated with the plunger axially moves. A spool valve is slidable coaxially with respect to the shaft in a cylindrical valve sleeve of the valve portion.

The solenoid valve is constructed by integrating the solenoid actuator and the valve portion. Therefore, the solenoid actuator needs to be connected with the valve sleeve. A cylindrical crimped portion is provided to one end of a metallic casing, which accommodates the solenoid actuator. The crimped portion is applied with crimping force in a condition, in which a connecting end face of a flange portion of the one end of the solenoid actuator is abutted to a connecting end face of a flange portion of the one end of the valve sleeve. Thus, the connecting end faces of both the flange portions are fixed and crimped to each other, so that the solenoid actuator is integrated with the valve portion.

However, the crimped portion is a part of the metallic case in the above structure. Accordingly, the structure of the crimped portion cannot be applied to a solenoid valve, which includes a resinous mold member accommodating a solenoid actuator, and a resinous housing, which has a fluid passage. According to a connecting structure shown in FIG. 6, a resinous mold member 101 has a flange portion, which is abutted to a flange portion of a resinous housing 102 having a fluid passage. The resinous mold member 101 accommodates a solenoid actuator.

A metallic ring 103 is engaged with the outer periphery of the flanges, subsequently, the metallic ring 103 is applied with crimping force, so that the resinous mold member 101 is crimped and fixed with the resinous housing 102. In this structure, when both the resinous mold member 101 and the resinous housing 102 have largest diameter portions that have outer diameters greater than the outer diameters of the corresponding flange portions, the metallic ring cannot be engaged after injection molding the resinous mold member 101 and the resinous housing 102. Accordingly, the resinous mold member 101 cannot be crimped with the resinous housing 102. Therefore, the outer diameter of at least one of the largest diameter portion needs to be less than the outer diameter of the flange portion.

However, in the resinous mold member 101, an electric connecter for the coil may outwardly protrude in a direction, which is substantially perpendicular to the crimping direction, in which the resinous mold member 101 is crimped and fixed with the resinous housing 102. Consequently, the electric connecter may radially protrude beyond the corresponding flange portion. In the resinous housing 102, a port of a fluid pipe may outwardly protrude in a direction, which is substantially perpendicular to the crimping direction, consequently, the fluid pipe may radially protrude beyond the corresponding flange portion.

SUMMARY OF THE INVENTION

In view of the foregoing and other problems, it is an object of the present invention to produce a manufacturing method for a connecting structure, in which a resinous casing can be readily crimped to a housing via flange portions, even when both the resinous casing and the housing have portions protruding beyond the corresponding flange portions.

According to one aspect of the present invention, an actuator includes a coil, a solenoid actuator, a resinous casing, a housing, and a metallic ring. The coil generates magnetic force when the coil is supplied with electricity. The solenoid actuator includes a magnetic member, which is magnetized when the coil is supplied with electricity, so that the magnetic member moves in an axial direction of the magnetic member. The resinous casing is in a substantially cylindrical shape. The resinous casing includes a first flange portion, which is in a substantially annular shape. The first flange portion is arranged on an outer periphery of the resinous casing. The housing includes a second flange portion, which is in a substantially annular shape. The second flange portion is arranged on an outer periphery of the housing. The second flange portion opposes to the first flange portion. The metallic ring engages with radially outer peripheries of the first flange portion and the second flange portion. One of the resinous casing and the housing accommodates the solenoid actuator. The metallic ring is bent so that a pair of annular hooking pieces is formed. The annular hooking pieces opposes to each other such that the annular hooking pieces interpose the first flange portion and the second flange portion from both sides in an axial direction, so that a connecting end surface of the resinous casing is crimped and fixed to a connecting end surface of the housing. A manufacturing method for the actuator includes the following steps. The metallic ring is set in a molding die for molding the resinous casing. The first flange portion is injection molded using one of the pair of annular hooking pieces as a part of the molding die in an injection molding process.

Alternatively, the actuator includes a first resin mold member and a second resin mold member instead of the resinous casing and the housing. The first resin mold member is in a substantially cylindrical shape. The first resin mold member includes a first flange portion. The second resin mold member includes a second flange portion. One of the first resin mold member and the second resin mold member accommodates the solenoid actuator. The metallic ring is bent, so that a connecting end surface of the first resin mold member is crimped and fixed to a connecting end surface of the second resin mold member. A manufacturing method for the actuator includes the following steps. The metallic ring is set in a molding die for molding one of the first resin mold member and the second resin mold member. One of the first flange portion and the second flange portion is injection molded using one of the pair of annular hooking pieces as a part of the molding die in an injection molding process.

Alternatively, a manufacturing method for a connecting structure includes the following steps. A metallic ring is set on one of a fixed die and a movable die such that one end portion of the metallic ring is exposed to a cavity formed between the fixed die and the movable die. The metallic ring is outsert-molded at least partially on a first flange portion of a resinous casing in a molding process so that the one end portion of the metallic ring is arranged on a surface, which is substantially opposite to a connecting end surface of the first flange portion. The connecting end surface of the first flange portion of the resinous casing is abutted onto a connecting end surface of a second flange portion of a housing. Crimping force is applied to an other end portion of the metallic ring to fix the resinous casing with the housing in a crimping process. The other end portion of the metallic ring is bent such that the other end portion of the metallic ring opposes to the one end portion of the metallic ring in the crimping process, so that the other end portion of the metallic ring and the one end portion of the metallic ring interpose the first flange portion and the second flange portion in an axial direction of the metallic ring.

A manufacturing method for an actuator includes the following steps. A solenoid actuator, which includes a coil, a fixed iron core, and a metallic ring are set on one of a fixed die and a movable die such that one end portion of a metallic ring is exposed to a cavity formed between the fixed die and the movable die. The solenoid portion and the fixed iron core are insert-molded in a resinous casing simultaneously with outsert-molding the metallic ring at least partially on a first flange portion of a resinous casing in a molding process, so that one end portion of the metallic ring is arranged on a surface, which is substantially opposite to a connecting end surface of the first flange portion. The connecting end surface of the first flange portion of the resinous casing is abutted onto a connecting end surface of a second flange portion of a housing. Crimping force is applied to an other end portion of the metallic ring to fix the resinous casing with the housing in a crimping process. The other end portion of the metallic ring is bent such that the other end portion of the metallic ring opposes to the one end portion of the metallic ring so that the other end portion of the metallic ring and the one end portion of the metallic ring interpose the first flange portion and the second flange portion in an axial direction of the metallic ring in the crimping process.

In this structure, the metallic ring is engaged with the radially outer side of the first and the second flanges, so that the connecting end surfaces can be readily crimped and fixed to each other using the metallic ring.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
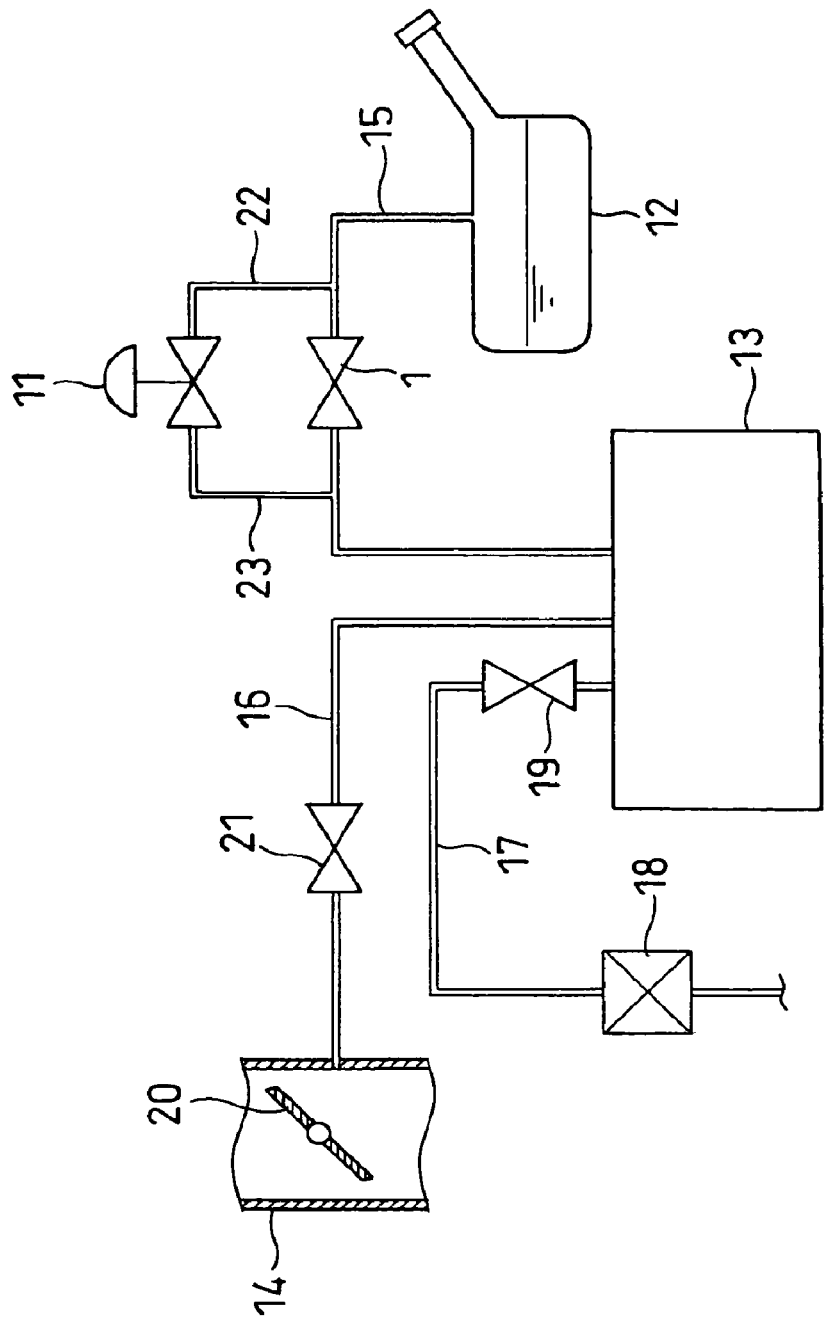
FIG. 1 is a schematic view showing an fuel evaporating apparatus, according to a first embodiment of the present invention.
Figure 2:
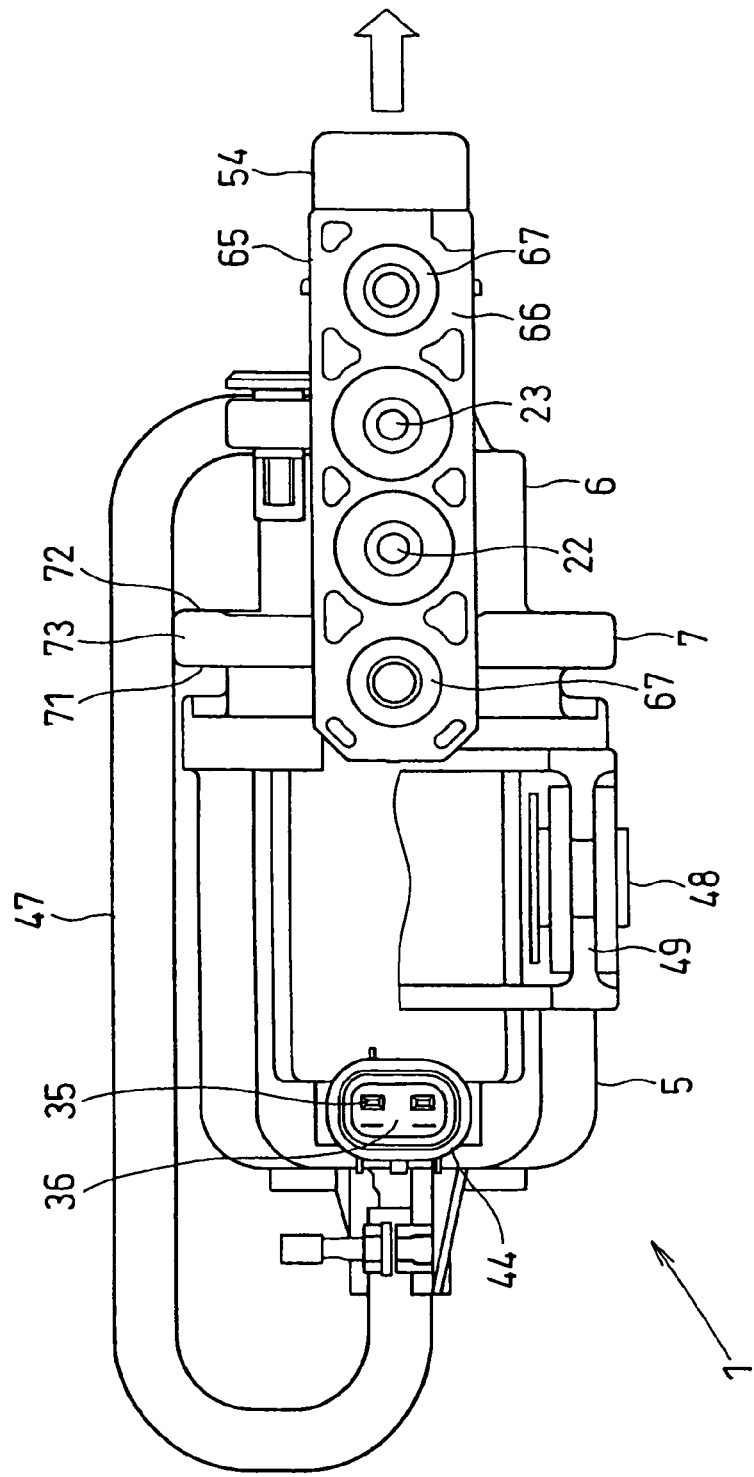
FIG. 2 is a top view showing a solenoid valve according to the first embodiment.

As shown in shown in FIG. 1, a vehicle such as an automobile has a fuel evaporating apparatus, in which fluid such as fuel is vaporized to be evaporative gas in a fuel tank 12. The fluid such as the evaporative gas is purged and introduced into an intake pipe 14 of an internal combustion engine such as a gasoline engine through a canister 13 using negative pressure in the intake pipe 14. Thus, the fuel evaporating apparatus restricts the fluid from being emitted to the atmosphere. A solenoid valve 1 includes an electro magnetic actuator (solenoid actuator). The solenoid valve 1 and a relief valve 11 are assembled to the fuel evaporating apparatus.

Specifically, in the fuel evaporating apparatus, the fuel tank 12 communicates with the canister 13 through a connecting pipe 15. The canister 13 communicates with the intake pipe 14 through a connecting pipe 16. A pressure sensor (tank inner pressure sensor, not shown) is provided to the fuel tank 12 for detecting pressure (tank inner pressure) of the inside of the fuel tank 12.

An absorbent such as active charcoal is accommodated in the canister 13 to absorb the fluid. The canister 13 has an atmospheric hole (vent hole) that connects with a vent pipe (atmospheric open pipe) 17. A filter 18 and a canister control valve 19 are provided in the vent pipe 17. The filter 18 filters air flowing into the canister 13. The canister control valve 19 is a normally open type solenoid valve that blocks the vent hole of the canister 13 as appropriate. Air can pass from the inlet, i.e., the vent hole of the vent pipe 17 through the filter 18. The filter 18 captures foreign matters contained in the air, thereby restricting foreign matters flowing into the intake pipe 14.

A throttle valve 20 is provided in the intake pipe 14 to control an amount of intake air flowing through an intake passage communicating with cylinders of the engine. A tank seal unit is constructed of the solenoid valve 1 and the relief valve 11. The tank seal unit is provided midway of the connecting pipe 15. A purge control valve 21 is provided midway of the connecting pipe 16 to control a purge amount of the fluid such as evaporative fuel. The connecting pipe 16 connects with the downstream of the throttle valve 20 on the side of an intake port of the engine. A leak check of the fluid such as evaporative fuel is performed in the following manner. The vent hole of the canister 13 is blocked using the canister control valve 19. Subsequently, the purge control valve 21 is opened, so that negative pressure in the intake pipe 14 is applied to the communicating pipes 15, 16. Next, the purge control valve 21 is blocked, so that the fluid is blocked. After elapsing predetermined time, the inner pressure of the fuel tank 12 is detected using the pressure sensor, so that it is evaluated whether the inner pressure increases. Thus, the leak check of the fluid can be performed.

The relief valve 11 is a pressure control valve that opens when pressure on the side of the fuel tank 12 becomes sufficiently greater than pressure on the side of the canister 13 The relief valve 11 is constructed of a valve port, a valve plug, a diaphragm, and a spring (nor shown). The valve port connects with bypass passages 22, 23, that bypass a valve plug 3 of the solenoid valve 1. The valve plug of the relief valve 11 opens and closes the vale port. The diaphragm of the relief valve 11 operates the valve plug in the direction, in which the valve plug opens the vale port. The spring of the relief valve 11 operates the valve plug in the direction, in which the valve plug closes the vale port. The valve port is formed in a valve body of the relief valve 11. The valve plug is movable in the valve body of the relief valve along the axial direction of a valve shaft in the relief valve 11. Pressure (standard pressure) on the side of the canister 13 is applied to the inside of a first pressure chamber of a casing of the relief valve 11. The casing of the relief valve 11 is partitioned using the diaphragm. Pressure on the side of the fuel tank 12 is applied to the inside of a second pressure chamber of the casing, which is partitioned using the diaphragm in the relief valve 11.

Next, the structure of the solenoid valve 1 is described.

The solenoid valve 1 is a normally close type valve. The solenoid valve 1 opens when the vehicle runs. Alternatively, the solenoid valve 1 opens until a predetermined time elapses immediately before supplying fuel into the fuel tank 12. The solenoid valve 1 closes a flow passage in a condition excluding the above conditions.

As shown in FIGS. 2 to 4C, the solenoid valve 1 includes the valve plug 3, a solenoid actuator 4, a first resinous housing (resinous casing, first resin mold member) 5, a second resinous housing (resinous casing, second resin mold member) 6, a metallic ring 7, and an O-ring (annular elastic member) 8.

The valve plug (valve) 3 opens and closes the fluid passage (valve port) 2, through which the fluid passes. The solenoid actuator 4 operates the valve 3 in the direction, in which the valve 3 opens the fluid passage. The first resin mold member 5 accommodates the solenoid actuator 4. The second resin mold member 6 is crimped and fixed to an end portion of the first resin mold member 5. The metallic ring 7 is crimped between the end portion of the mold member 5 and an end portion of the second resin mold member 6, so that the solenoid actuator 4 connects with the second resin mold member 6. The O-ring 8 restricts the fluid from leaking to the outside of the solenoid valve 1.

For example, the valve 3 is formed of an elastomer such as silicone rubber. The valve 3 connects with the solenoid actuator 4 via a valve shaft 24. The valve 3 is formed in a substantially cylindrical shape. One axial end of the valve shaft 24 engages with the valve 3. The valve 3 is axially movable in an inner space 25 of the second resin mold member 6. When the valve 3 is seated onto a valve seat 26 of the second resin mold member 6, the valve 3 closes the valve port 2, so that the valve 3 blocks the communication between the fuel tank 12 and the canister 13. When the valve 3 is lifted from the valve seat 26 of the second resin mold member 6, the valve 3 opens the valve port 2, so that the fuel tank 12 communicates with the canister 13.

The solenoid actuator 4 is constructed of a solenoid coil 29, a coil bobbin 30, a magnetic plate 31, a stator core 32, a yoke 33, and a moving core (magnetic member) 34. The solenoid coil 29 is constructed of a winding, which is wound for a predetermined number. The coil bobbin 30 has a pair of collar portions. The solenoid coil 29 is wound between the pair of collar portions of the coil bobbin 30. When the solenoid coil 29 is supplied with electricity, the magnetic plate 31 and the moving core 34 are magnetized, so that the moving core 34 axially moves together with the valve 3 and the valve shaft 24. Specifically, the solenoid coil 29 is supplied with electricity, so that the solenoid coil 29 generates magnetic force, thereby magnetizing the magnetic plate 31, the stator core 32, the yoke 33, and the moving core 34. Thus, the solenoid coil 29 operates the valve 3, the valve shaft 24, and the moving core 34 in the direction, in which the valve 3 opens the valve port 2. The solenoid coil 29 is constructed in such a manner that a wire, which is covered with an insulative coating, is wound around a coil receiving portion in the coil bobbin 30. The coil receiving portion is in a substantially cylindrical shape, and is formed between the stator core 32 and the yoke 33.

The solenoid coil 29 includes a coil portion and a pair of terminal lead wires (terminal lines). The coil portion is constructed such that the wire is wound around the outer circumferential periphery of the coil bobbin 30. The terminal lead wires are taken out of the coil portion. The radially outer portion of the coil portion of the solenoid coil 29 is covered with the first resin mold member 5, thereby being protected with the first resin mold member 5. The pair of terminal lead wires of the solenoid coil 29 is electrically connected with a pair of external terminals 35 by crimping, welding, or the like. The pair of external terminals 35 electrically connects with an external power source or a solenoid operating circuit. Tip ends of the external terminals 35 are exposed to an inner space 36 of the first resin mold member 5. The tip ends of the external terminals 35 are inserted into a female connector on the side of the external power source or a solenoid operating circuit. Thus, the tip ends of the external terminals 35 serve as connector pins for the electrical connection.

The coil bobbin 30 is molded of an electrically insulative resin such as poly butylene terephthalate (PBT) and poly amide resin (PA). The coil bobbin 30 is a primary molded member, which is primarily molded of the electrically insulative resin. The coil bobbin 30 is fixed to the first resin mold member 5. The coil bobbin 30 includes a guide portion, which is in a substantially cylindrical shape, and the pair of collar portions. The wire is wound around the outer circumferential periphery of the guide portion of the coil bobbin 30 in the coil portion of the solenoid coil 29. The collar portions radially outwardly protrude from axial end portions of the guide portion of the coil bobbin 30.

The magnetic plate 31 is formed of a magnetic material to be in a substantially disc shape. The magnetic plate 31 is insert-molded in the first resin mold member 5 together with the solenoid coil 29, the coil bobbin 30, the stator core 32, the yoke 33, the terminals 35, and the like, thereby constructing a coil assembly. The magnetic plate 31 tightly makes contact with one of the collar portions of the coil bobbin 30 that has the outer circumferential periphery (one end surface).

Figure 3A:
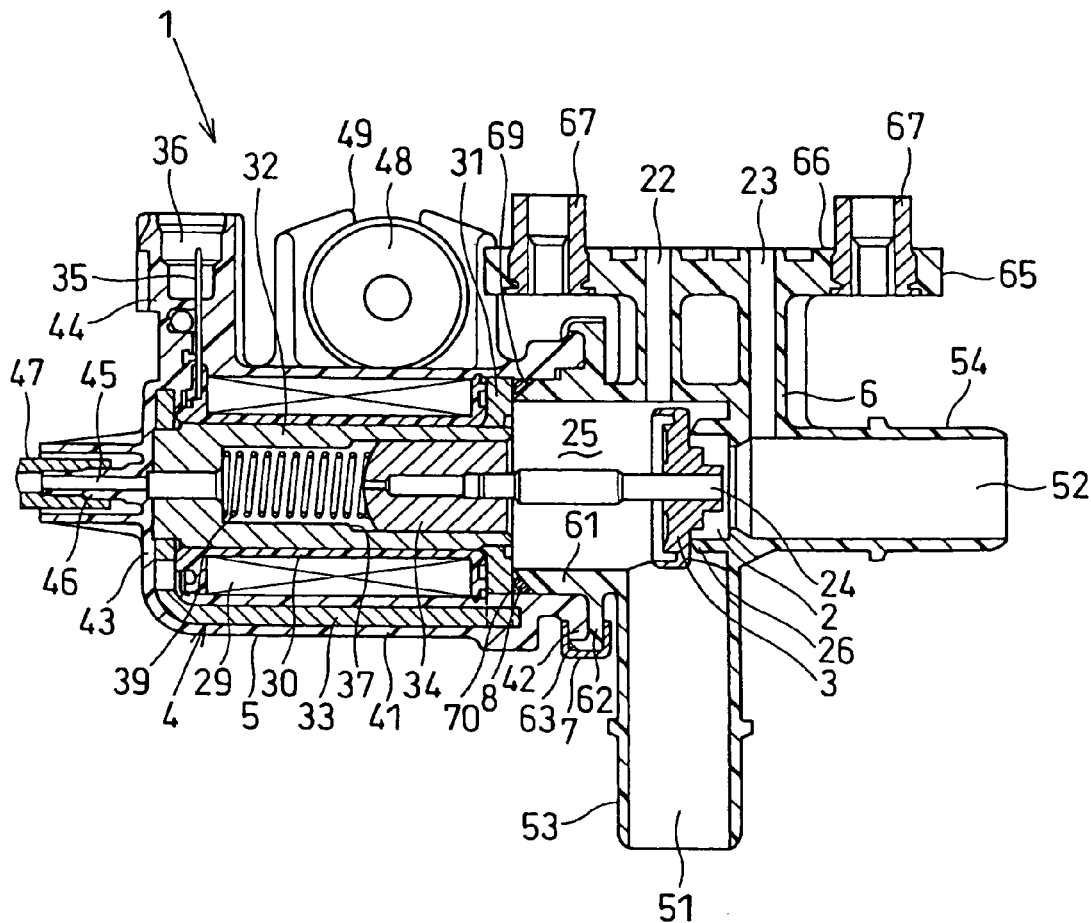
FIG. 3A is a partially cross-sectional side view showing the solenoid valve.

Here, one end indicates on the right side in FIG. 3A, and the other end indicates on the left side in FIG. 3A.

The magnetic plate 31 is arranged on the outer circumferential side of one axial end of the stator core 32. The magnetic plate 31 has the one end surface, to which the O-ring 8 is arranged, such that the one end surface of the magnetic plate 31 closely makes contact with the O-ring 8.

The stator core 32 is formed of a magnetic material to be in a substantially cylindrical shape. The stator core 32 has the one end surface that is located in a plane substantially the same as the plane of the one end surface of the magnetic plate 31. The stator core 32 has the other end that includes a small diameter portion. The stator core 32 is fixed to the inner circumferential periphery of the guide portion of the coil bobbin 30. In this condition, the stator core 32 is insert-molded in the first resin mold member 5. The stator core 32 has an attracting portion 37 that is magnetized to attract the moving core 34 when the solenoid coil 29 is supplied with electricity. The stator core 32 has an axial hole that accommodates a return spring (valve biasing member) 39. The axial hole serves as a spring chamber. The return spring 39 biases the valve 3, the valve shaft 24, and the moving core 34 in the direction, in which the valve 3 closes the valve port 2.

The yoke 33 is formed of a magnetic material to be in a substantially cylindrical shape. The yoke 33 constructs a magnetic circuit together with the solenoid coil 29, the magnetic plate 31, the stator core 32, and the moving core 34. The yoke 33 is insert-molded in the first resin mold member 5. The yoke 33 is constructed of a cylindrical portion, an annular portion, and the like. The cylindrical portion of the yoke 33 is arranged on the radially outer side of the solenoid coil 29 and the coil bobbin 30. The annular portion of the yoke 33 is provided to the other end portion of the cylindrical portion of the yoke 33 relative to the axial direction of this cylindrical portion, so that the small diameter portion of the stator core 32 engages with the annular portion of the yoke 33.

The moving core 34 is formed of a magnetic material to be in a substantially cylindrical shape. The moving core 34 is magnetized when the solenoid coil 29 is supplied with electricity, so that the moving core 34 is attracted to the attracting portion 37 of the stator core 32. The moving core 34 has an inner space, with which the other end portion of the valve shaft 24 relative to the axial direction engages. The outer circumferential periphery of the moving core 34 and the inner circumferential periphery of the stator core 32 form a predetermined gap therebetween. Thus, the moving core 34 is accommodated in the axial hole of the stator core 32, such that the moving core 34 is axially movable in the stator core 32.

The first resin mold member 5 is formed of an electrically insulative resin such as poly butylene terephthalate (PBT) and poly amide resin (PA). The first resin mold member 5 is a secondary molded member, which is secondarily molded of the electrically insulative resin. The first resin mold member 5 includes a cylindrical portion 41, an annular portion 43, a connecter shell (female connector portion) 44, and the like. The cylindrical portion 41 is arranged on the radially outer side of the coil portion of the solenoid coil 29, and is arranged on the radially outer side of the coil bobbin 30. The annular portion 43 is provided to a left end portion of the cylindrical portion 41 axially on the left side in FIG. 3A. The connecter shell 44 is provided to the outer circumferential periphery of the other end portion of the cylindrical portion 41.

The yoke 33 is insert-molded in the cylindrical portion 41. The cylindrical portion 41 has an inner circumferential periphery, to which the magnetic plate 31 is fixed. The cylindrical portion 41 has the one end portion relative to the axial direction thereof on the right side in FIG. 3A. The one end portion of the cylindrical portion 41 has a connecting end surface, which is in a substantially annular shape. The connecting end surface of the cylindrical portion 41 connects with a connecting end surface of the second resin mold member 6. The outer circumferential periphery of the cylindrical portion 41 is integrally formed with a first flange portion 42, which is in a substantially annular shape. The first flange portion 42 outwardly protrudes in the radial direction that is substantially perpendicular to the axial direction of the cylindrical portion 41. The first flange portion 42 has the other surface, which is on the opposite side of the connecting end surface. The one end portion of the metallic ring 7 is outsert-molded to the other surface of the first flange portion 42.

The annular portion 43 has a pipe portion 46 that has a pressure releasing hole 45 for facilitating the operation of the moving core 34. The pipe portion 46 connects with a hose 47 that communicates the pressure releasing hole 45 with the inner space 25 of the second resin mold member 6 or a fluid passage 52. The connecter pins of the tip ends of the terminals 35 are exposed to the inner space 36 of the connecter shell 44, thereby being capable of engaging with the female connector of the external power source or the solenoid operating circuit. The connecter shell 44 is integrally formed with the outer circumferential periphery of the cylindrical portion 41. The connecter shell 44 outwardly protrudes in the radial direction of the cylindrical portion 41. The radial direction of the cylindrical portion 41 is substantially perpendicular to the axial direction of the cylindrical portion 41. The cylindrical portion 41 has the outer circumferential periphery that is integrally formed with a mounting stay portion 49, which includes a cylindrical collar 48 having a through hole. The mounting stay 49 is screwed to an upper wall of the fuel tank using a screwing member such as a bolt, which is inserted into the through hole of the cylindrical collar 48.

The second resin mold member 6 is integrally molded of a thermoplastic resin such as poly butylene terephthalate (PBT) to be in a predetermined shape. The second resin mold member 6 forms the inner space 25 with the one end surface of the solenoid actuator 4 relative to the axial direction of the solenoid actuator 4. The one end surface of the solenoid actuator 4 includes the one end surface of the magnetic plate 31 and the one end surface of the stator core 32.

The second resin mold member 6 has fluid passages 51, 52 that connect with the inner space 25. The fluid passages 51, 52 are arranged to be in a substantially L-shape. The second resin mold member 6 serves as a passage forming member. The second resin mold member 6 is formed integrally with a fluid pipe (inlet pipe) 53 on the upstream side thereof on the lower side in FIG. 3A. The fluid pipe 53 is in a substantially cylindrical shape, and connects with the fuel tank 12 through an upstream side portion of the connecting pipe 15. The fluid pipe 53 has fluid passage (tank side passage) 51 defining the inlet port therein. A fluid pipe (outlet pipe) 54 is integrally formed with the second resin mold member 6 on the downstream side thereof. The fluid pipe 54 is in a substantially cylindrical shape, and connects with the canister 13 via the downstream side portion of the connecting pipe 15. The fluid passage (canister side passage) 52 is formed in the fluid pipe 54. The fluid passage 52 defines an outlet port therein.

The inner space 25 is formed in the cylindrical portion 61 that engages with the inner periphery of the cylindrical portion 41 of the first resin mold member 5. The inner space 25 has a valve chamber and a fluid passage. The valve 3 is axially movable in the valve chamber of the inner space 25. The fluid pipe 54 is formed in the axial direction of the cylindrical portion 61 of the second resin mold member 6. The fluid pipe 53 is integrally formed with the outer circumferential periphery of the cylindrical portion 61 of the second resin mold member 6. Specifically, the fluid pipe 53 outwardly protrudes in the radial direction, which is substantially perpendicular to the axial direction of the cylindrical portion 61 of the second resin mold member 6. The valve seat 26 of the second resin mold member 6 is arranged in a cylindrical wall portion protruding to the side of the solenoid actuator 4 beyond the end surface of a cylindrical partition wall, which partitions the inner space 25 from the fluid passage 52. The valve seat 26 has a valve port 2, through which air passes. The inner space 25 communicates with the fluid passage 52 through the valve port 2. The valve port 2 can be blocked using the valve 3.

The outer circumferential periphery of the cylindrical portion 61 of the second resin mold member 6 is integrally molded with a second flange portion 62, which is in a substantially annular shape. The second flange portion 62 has a connecting end surface, which is in a substantially annular shape, connecting with the connecting end surface of the first flange portion 42 of the first resin mold member 5. The outer circumferential periphery of the second flange portion 62 is integrally molded with a protruding portion 63, which is in a substantially annular shape. The protruding portion 63 of the second flange portion 62 engages with the outer circumferential periphery of the first flange portion 42 of the first resin mold member 5 The cylindrical portion 61, the second flange portion 62, and the protruding portion 63 surround a space, which serves as an engaging hole (engaging portion) 64, which is in a substantially cylindrical shape. The first flange portion 42 of the first resin mold member 5 engages with the engaging hole 64 of the second resin mold member 6.

The outer circumferential periphery of the cylindrical portion 61 of the second resin mold member 6 is integrally formed with a bracket 65, to which the valve body of the relief valve 11 is mounted. The bracket 65 has the bypass passage 22, through which the inner space 25, the valve port of the relief valve 11, and the second pressure chamber of the relief valve 11 communicate with each other. The bracket 65 has a mounting portion 66, to which the relief valve 11 is mounted. An insert nut 67 is insert-molded in the mounting portion 66. A bolt is inserted into the insert nut 67 to screw the valve body of the relief valve 11 onto the mounting portion 66. The cylindrical portion 61 of the second resin mold member 6 engages with the inner circumferential periphery of the cylindrical portion 41 of the first resin mold member 5. The cylindrical portion 61 of the second resin mold member 6 has a tip end portion that opposes to the connecting end surface of the solenoid actuator 4, i.e., the one end surface of the magnetic plate 31. This tip end portion of the cylindrical portion 61 has a taper portion 69, which is in a substantially conical shape. The taper portion 69 has the diameter that decreases to the end thereof.

The connecting end surface of the solenoid actuator 4 (one end surface of the magnetic plate 31), the inner circumferential periphery of the cylindrical portion 41 of the first resin mold member 5, and the outer circumferential periphery of the taper portion 69 of the cylindrical portion 61 of the second resin mold member 6 form an annular space 70 thereamong. The annular space 70 accommodates the O-ring 8 such that the O-ring 8 is elastically deformed in the annular space 70, so that the O-ring 8 restricts the fluid from leaking to the outside of the solenoid valve 1. The taper portion 69 has a taper angle such that elastic force of the O-ring 8 is applied in the axial direction of the cylindrical portion 61 of the second resin mold member 6.

The metallic ring 7 is integrally formed of a metallic material such as stainless steel. The metallic ring 7 has the one end that makes contact with the first flange portion 42 of the first resin mold member 5. The metallic ring 7 has the other end that makes contact with the second flange portion 62 of the second resin mold member 6. In this condition, the metallic ring 7 integrally connects the solenoid actuator 4 with the second resin mold member 6, so that the metallic ring 7 serves as a connecting member. The metallic ring 7 is press-formed, for example, so that the metallic ring 7 is formed to be in the shape shown in FIG. 4B. Specifically, first, a substantially annular hooking piece 71 is formed, and subsequently, a substantially cylindrical engaging portion 73 is formed. The annular hooking piece 71 is outsert-molded on the surface of the first flange portion 42 of the first resin mold member 5 on the opposite side of the connecting end surface thereof. The cylindrical engaging portion 73 is bent to be in the direction substantially perpendicular to the outer circumferential periphery of the annular hooking piece 71.

Figure 3B:
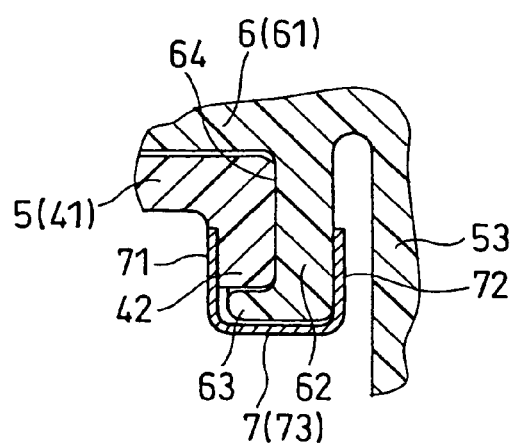
FIG. 3B is an enlarged cross-sectional side view showing a portion of the solenoid valve, according to the first embodiment.

The metallic ring 7 is applied with crimping force to the cylindrical engaging portion 73 using a crimping die or punch. That is, bending work is performed to the cylindrical engaging portion 73 of the metallic ring 7, so that a pair of the annular hooking pieces 71, 72 is formed. As shown in FIG. 3B, the pair of the annular hooking pieces 71, 72 is opposed to each other such that the annular hooking pieces 71, 72 interposes the first flange portion 42 and the second flange portion 62 from both sides in the axial direction thereof. The crimping work is performed to the cylindrical engaging portion 73, and this cylindrical engaging portion 73 is engaged with the radially outer side of both the first flange portion 42 of the first resin mold member 5 and the second flange portion 62 of the second resin mold member 6. The cylindrical engaging portion 73 is bent to be in the direction, which is substantially perpendicular to the surfaces of the annular hooking pieces 71, 72. The annular hooking piece 71 and the cylindrical engaging portion 73 have an R-shaped portion therebetween. The annular hooking piece 72 and the cylindrical engaging portion 73 have an R-shaped portion therebetween. In this embodiment, the cylindrical engaging portion 73 of the metallic ring 7 has a groove 74 (FIG. 4B) that restricts the fluid pipe 53 and the bracket 65 from causing interference with other components.

Next, a manufacturing method of the solenoid valve 1 is described in reference to FIGS. 1 to 5.

First, a primary molding process is described.

The coil bobbin 30 is molded of resin in an injection molding dies (primary molding dies), which is constructed of a fixed die and a movable die. A molding surface of the fixed die and a molding surface of the movable die form a cavity therebetween. The cavity has the shape corresponding to the shape of a product of the coil bobbin 30. First, heated molten thermoplastic resin (primary resinous material, molten resin) is supplied into at least one gate formed in the injection molding dies, so that the cavity formed in the injection molding dies is filled with the molten resin. The molten resin in the cavity is taken out of the injection molding dies, and is cooled to be solidified. Alternatively, cooling medium such as cooling water is circulated around the cavity of the injection molding dies, so that the molten resin is cooled and solidified in the cavity. Thus, the coil bobbin 30 having the substantially cylindrical guide portion and the substantially annular collar portion is primary molded of resin.

Second, a winding process is described.

Figure 4A:
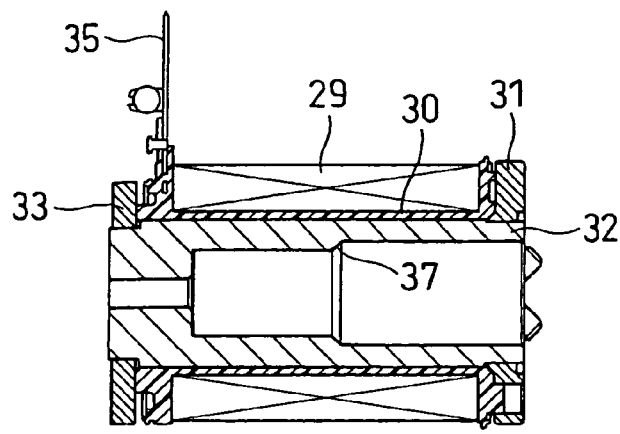
FIG. 4A is a partially cross-sectional side view showing a coil assembly of the solenoid valve.

The other end portion of the terminal 35 is inserted into at least one of the pair of collar portions of the coil bobbin 30, thereby being assembled to the coil bobbin 30. Subsequently, the lead wire, which is coated to be electrically insulative, is wound around the outer circumferential periphery of the guide portion of the coil bobbin 30. The lead wire is wound for a predetermined winding number between the pair of the collar portions of the coil bobbin 30, thereby constructing the coil portion of the solenoid coil 29. The terminal lead wire of the solenoid coil 29 is connected with the other end portion of the terminal 35 using a connecting method such as crimping and welding. Thus, as shown in FIG. 4A, the winding portion (solenoid portion), which includes the solenoid coil 29, the coil bobbin 30, and the terminal 35, is constructed.

Third, a press-forming process is described.

Figure 4B:
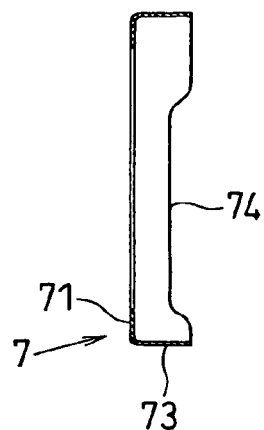
FIG. 4B is a cross-sectional side view showing a metallic ring of the solenoid valve.

A metallic plate is punched to be in a predetermined shape, such that the groove 74 is formed in the tip end of the metallic plate. That is, the groove 74 is formed in the tip end of the cylindrical engaging portion 73 of the metallic plate 7. The tip end of the cylindrical engaging portion 73 is formed to be in the annular hooking piece 72 after being crimped. The groove 74 restricts the fluid pipe 53 and the bracket 65 from causing interference. The metallic plate having the groove 74 is deformed by press-forming, for example, so that the metallic plate has a steric shape. Specifically, as shown in FIG. 4B, the metallic plate having the groove 74 is bent relative to the direction of the surface thereof, so that the metallic ring 7 having the annular hooking piece 71 and the cylindrical engaging portion 73 is formed. In this condition, specifically, the cylindrical engaging portion 73 having the tip end defining the groove 74 is bent substantially perpendicularly on the outer circumferential periphery of the annular hooking piece 71.

Fourth, a secondary molding process (injection molding process) is described.

The first resin mold member 5, which includes the first flange portion 42, is molded of resin in an injection molding dies (secondary molding dies), which is constructed of a fixed die 91 and a movable die 92. A molding surface of the fixed die 91 and a molding surface of the movable die 92 form a cavity 93 therebetween. The cavity 93 has the shape corresponding to the shape of a product of the first resin mold member 5. One of the fixed die 91 and the movable die 92 has a ring retaining portion 94 that holds the other end portion (cylindrical engaging portion 73) of the metallic ring 7. In this condition, the one end portion (annular hooking piece 71) of the metallic ring 7 is exposed to the cavity 93.

Subsequently, the solenoid portion, which is constructed of the solenoid coil 29, the coil bobbin 30, and the terminal 35, is set in the cavity 93 of the injection molding dies. A fixed iron core, which is constructed of the magnetic plate 31, the stator core 32, and the yoke 33, is set in the cavity 93 of the injection molding dies.

The annular hooking piece 71 of the metallic ring 7 is set in the cavity 93 to be in a condition, in which the surface of the annular hooking piece 71, which is opposite to the connecting end surface, is closely fitted to the molding surface of the fixed die 91. The solenoid portion includes the solenoid coil 29, the coil bobbin 30, and the terminal 35. The coil assembly, which includes the solenoid portion and the fixed iron core, is embedded in resin in the secondary molding process. Thus, fluid such as raindrop and splash of water can be restricted from intruding into the solenoid portion, and the solenoid portion can be protected.

In this molding, first, heated molten thermoplastic resin (secondary resinous material, molten resin) is supplied into at least one gate formed in the injection molding dies 91, 92, so that the cavity 93 formed in the injection molding dies 91, 92 is filled with the molten resin. The molten resin in the cavity 93 is taken out of the injection molding dies 91, 92, and is cooled to be solidified. Alternatively, cooling medium such as cooling water is circulated around the cavity 93 of the injection molding dies 91, 92, so that the molten resin is cooled and solidified in the cavity 93. Thus, the first resin mold member, which includes the annular portion 41, the first flange portion 42, the connecter shell 44, and the like, is secondary molded of resin.

Figure 4C:
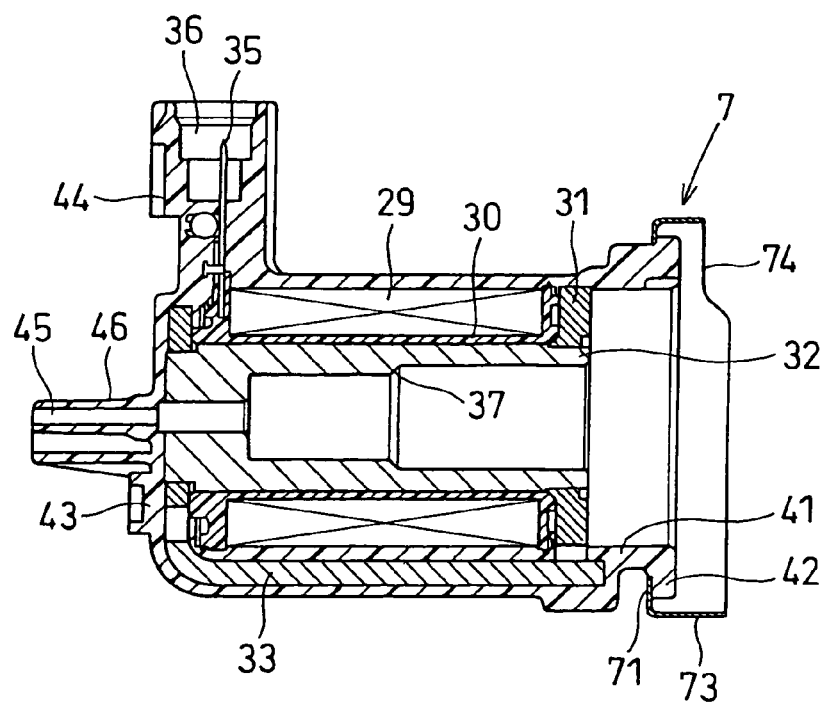
FIG. 4C is partially a cross-sectional side view showing a first resin mold member of the solenoid valve, the coil assembly, and the metallic ring, according to the first embodiment.
Figure 5:
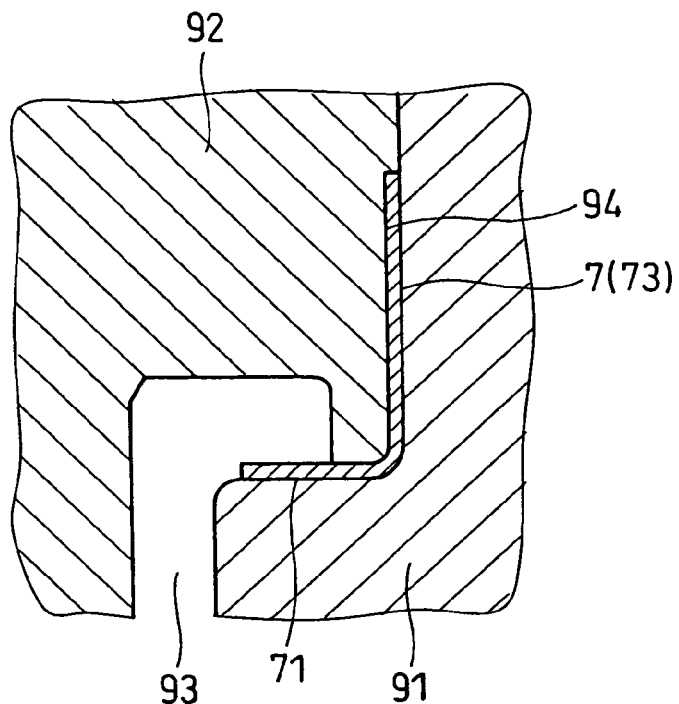
FIG. 5 is a cross-sectional side view showing dies of an injection molding apparatus according to the first embodiment.

Simultaneously, as shown in FIG. 4C, the coil assembly is insert-molded as an insert member in the first resin mold member 5, which is molded of thermoplastic resin. The coil assembly includes the solenoid coil 29, the coil bobbin 30, the magnetic plate 31, the stator core 32, the yoke 33, and the terminal 35. Furthermore, as referred to FIG. 5, the annular hooking piece 71 of the metallic ring 7 is outsert-molded on the surface, which is opposite to the connecting end surface of the first flange portion 42 of the first resin mold member 5. Molding lubricant may be applied on the one end surface of the annular hooking piece 71 of the metallic ring 7. In this case, the annular hooking piece 71 becomes rotatable relative to the surface of the first flange portion 42 opposite to the connecting end surface of the first flange portion 42, after the first resin mold member 5 is cooled and solidified.

A recess portion (notch portion) or a protruding portion (claw-shaped portion) may be provided to the annular hooking piece 71 of the metallic ring 7. In this case, the position of the metallic ring can be fixed with respect to the surface of the first flange portion 42 on the side opposite to the connecting end surface of the first flange portion 42.

Fifth, an assembling process is described.

First, both the end portions of the valve shaft 24 are inserted into an axial hole of the valve 3 and an axial hole of the moving core (movable iron core) 34. As a result, a movable member is constructed of the valve 3, the valve shaft 24, and the moving core 34. The return spring 39 is inserted into an axial hole of the stator core 32 of the product of the secondary molding process. This product of the secondary molding process includes the first resin mold member 5. Subsequently, the movable member, which includes the moving core 34, is inserted into the axial hole of the stator core 32 on the side of the inlet with respect to the attracting portion 37.

Next, the connecting end surface of the second flange portion 62 of the second resin mold member 6 is abutted onto the connecting end surface of the first flange portion 42 of the first resin mold member 5, after molding the second resin mold member 6. In this condition, the other end portion (cylindrical engaging portion 73) of the metallic ring 7 is applied with crimping force using a crimping punch, a crimping die, or the like, so that the other end portion (cylindrical engaging portion 73) of the metallic ring 7 causes plastic deformation. Specifically, the other end portion (cylindrical engaging portion 73) of the metallic ring 7 is bent along the profile of an edge portion (R-shaped portion) of the second flange portion 62 of the second resin mold member 6. Thus, the pair of the annular hooking pieces 71, 72 is formed such that the pair of the annular hooking pieces 71, 72, which is opposed to each other, interposes the first flange portion 42 and the second flange portion 62 from both sides in the axial direction thereof. In addition, the cylindrical engaging portion 73 is formed such that the cylindrical engaging portion 73 engages with the radially outer side of the first flange portion 42 of the first resin mold member 5 and the radially outer side of the second flange portion 62 of the second resin mold member 6.

Particularly, the annular hooking piece 71 of the metallic ring 7 is set on the die (crimping die), and the crimping punch is applied in the vicinity of the R-shaped portion between the annular hooking piece 72 and the cylindrical engaging portion 73. As a result, the annular hooking piece 71 closely makes contact with the surface of the first flange portion 42 opposite to the connecting end surface of the first flange portion 42 of the first resin mold member 5. Thus, the R-shaped portion between the annular hooking piece 72 and the cylindrical engaging portion 73 closely makes contact with the edge portion (R-shaped portion) of the second flange portion 62 of the second resin mold member 6. That is, the crimping work is performed such that the crimping force is applied between the first and second flange portions 42, 62 in a condition, in which the crimping force is slanted relative to the axial direction for a predetermined slant angle. Thus, the connecting end surface of the second flange portion 62 of the second resin mold member 6 makes closely contact with the connecting end surface of the first flange portion 42 of the first resin mold member 5. In the above process, the connecting end surface of the second flange portion 62 is crimped and fixed to the connecting end surface of the first flange portion 42. Thus, as referred to FIG. 3A, the solenoid actuator 4 including the first resin mold member 5 and the second resin mold member 6 are integrated to the solenoid valve 1.

Next, the operation of the solenoid valve 1 is described.

When the solenoid coil 29 of the solenoid actuator 4 of the solenoid valve 1 is supplied with electricity, the solenoid coil 29 generates magnetic force, thereby, magnetizing the magnetic plate 31, the stator core 32, the yoke 33, and the moving core 34. The moving core 34 is attracted to the attracting portion 37 of the stator core 32, so that the valve 3, which is fixed to the moving core 34 via the valve shaft 24, moves to the left side in FIG. 3A against the biasing force of the return spring 39. Thus, the valve 3 lifts from the valve seat 26 of the second resin mold member 6, so that the valve port 2 opens. The fluid such as fuel vaporized (evaporated) in the fuel tank 12 flows into the solenoid valve 1 through the upstream side of the connecting pipe 15 (FIG. 1). The fluid flows into the downstream of the connecting pipe 15 after passing through the inlet port, the fluid passage 51, the inner space 25, the valve port 2, the fluid passage 52, and the outlet port. Thus, the fluid is absorbed into the absorbent of the canister 13.

As referred to FIG. 1, when pressure on the side of the fuel tank 12 becomes greater than predetermined pressure on the side of the canister 13, the diaphragm of the relief valve 11 is displaced against the biasing force of the spring in the relief valve 11. The valve shaft, which connects the diaphragm with the valve plug, axially moves in the relief valve 11, thereby lifting the valve plug from the valve seat, so that the valve port opens in the relief valve 11. By contrast, when pressure on the side of the fuel tank 12 becomes equal to or less than the predetermined pressure on the side of the canister 13, the diaphragm of the relief valve 11 is displaced by the biasing force of the spring in the relief valve 11. The valve shaft axially moves in the relief valve 11, thereby seating the valve plug onto the valve seat, so that the valve port closes in the relief valve 11. The fuel in the fuel tank 12 evaporates to be vapor, so that pressure in the fuel tank 12 may increase, while the valve 3 of the solenoid valve 1 blocks the valve port 2. However, even in this condition, the fluid such as evaporated fuel entering into the solenoid valve 1 flows into the canister 13 after passing through the inlet port, the fluid passage 51, the inner space 25, the bypass passage 22, the valve port of the relief valve 11, the bypass passage 23, the fluid passage 52, and the outlet port, in the above operation. As described above, the valve port of the relief valve 11 connects with bypass passages 22, 23, that bypass the valve plug 3 of the solenoid valve 1. Therefore, the fluid can be restricted from leaking through a coupling portion of pipes due to increase in pressure in the fuel tank 12.

Next, effects of this embodiment are described.

Figure 6:
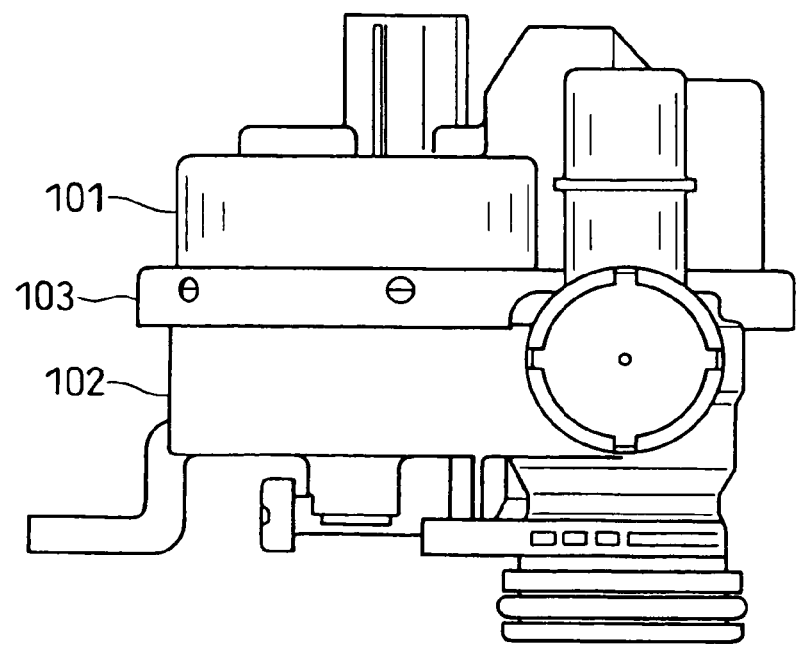
FIG. 6 is a front view showing a solenoid valve according to a prior art.

In the solenoid valve 1, the substantially annular metallic ring 7 engages with the radially outer side of the first flange portion 42 of the first resin mold member 5 and the radially outer side of the second flange portion 62 of the second resin mold member 6. Therefore, the connecting end surface of the second flange portion 62 is crimped and fixed to the connecting end surface of the first flange portion 42. In the prior art shown in FIG. 6, the metallic ring 103 is engaged with the radially outer side of the flange portions of the molding member 101 and the resinous housing 102, after molding the molding member 101 and the resinous housing 102 of resin. By contrast, in this embodiment, the annular hooking piece 71 of the metallic ring 7 is outsert-molded on the surface of the first flange portion 42 opposite to the connecting end surface of the first flange portion 42 of the first resin mold member 5, in advance. Subsequently, the first flange portion 42 of the first resin mold member 5 is engaged with the second flange portion 62 of the second resin mold member 6. The one end portion (cylindrical engaging portion 73) of the metallic ring 7 is applied with the crimping force, so that the cylindrical engaging portion 73 is bent midway thereof. Thus, the connecting end surface of the first resin mold member 5 is crimped to the connecting end surface of the second resin mold member 6. The solenoid actuator 4 including the first resin mold member 5 is integrally connected with the second resin mold member 6 in the above method, dissimilarly to the prior art shown in FIG. 6.

The first and second resin mold members 5, 6 may have a large diameter portion, which has the outer diameter greater than the outer diameter of the first and second flange portions 42, 62, such as the connecter shell 44 and the fluid pipe 53. That is, the large diameter portion such as the connecter shell 44 and the fluid pipe 53 protrudes beyond the outer circumferential periphery of the first and second flange portions 42, 62. Specifically, the connecter shell 44 outwardly protrudes in the radial direction, which is substantially perpendicular to the axial direction of the cylindrical portion 41. The fluid pipe 53 outwardly protrudes in the radial direction, which is substantially perpendicular to the axial direction of the cylindrical portion 61 of the second resin mold member 6. However, in this embodiment, even when the first and second resin mold members 5, 6 have such large diameter portion, the metallic ring 7 is engaged with the radially outer side of the first and the second flanges 42, 62, so that the connecting end surface of the second resin mold member 6 can be readily crimped and fixed to the connecting end surface of the first resin mold member 5 using the metallic ring 7.

Furthermore, the annular hooking piece 71 of the metallic ring 7 is used as a part of the injection molding dies, so that the annular hooking piece 71 can readily fit closely to the first flange portion 42. Thus, the first resin mold member 5 and the second resin mold member 6 can produce steady connecting strength (fixing force) therebetween.

The taper portion 69 of the second resin mold member 6 has the surface, which is slanted for the taper angle, such that elastic force of the O-ring 8 is applied in the axial direction of the second resin mold member 6. Therefore, connecting strength between the annular hooking piece 72 of the metallic ring 7 and the second flange portion 62, which are closely fitted, can be enhanced after crimping the metallic ring 7. Simultaneously, connecting strength between the annular hooking piece 71 of the metallic ring 7 and the first flange portion 42, which are closely fitted, can be enhanced after crimping the metallic ring 7. Thus, the connecting strength, which is produced using the metallic ring 7, between the first resin mold member 5 and the second resin mold member 6 can be restricted from being reduced, and the metallic ring 7 can be restricted from dropping out of the first and second flanges 42, 62.

[Variation]

The above method for manufacturing the actuator is not limited to be applied for the solenoid valve 1, which is used as a tank seal valve in the fuel evaporating apparatus of a vehicle. The above structure and method may be used for any other manufacturing method of a coupling structure. For example, the above structure and the above method may be used for a solenoid valve used in an auxiliary device of a vehicle and an air conditioning apparatus. The fluid is not limited to gas such as air and evaporated fuel. The fluid may be vapor such as vapor-phase refrigerant. The fluid may be liquid such as water, fuel, oil, and liquid-phase refrigerant. The fluid may be two-phase fluid, for example.

In this embodiment, the manufacturing method is applied to a solenoid valve, which is normally closed. However, the manufacturing method may be applied to a solenoid valve, which is normally opened. The amount of lift of the valve from the valve seat may be increased or decreased, in accordance with voltage applied to the coil or electricity supplied to the coil. That is, the above method may be applied to a flow control valve using a solenoid. The above method may be applied to an electromagnetic switch (magnet switch) for a starter as an engine starting apparatus. In this case, a second flange portion of a housing, which accommodates a magnetic member, is crimped with a first flange portion of a resinous casing, into which a fixed contact is secured, using a metallic ring. The magnetic member may be a pull-in coil and a holding coil, for example. A movable contact, which moves integrally with the magnetic member, makes contact with and separates from the fixed contact.

The above manufacturing method is not limited to be applied to the solenoid valve. The above manufacturing method may be applied to an electric feed apparatus such as a compressor, a blower, a pump, which pressurize fluid such as gas and liquid, and the like. In this case, a first flange portion of a resinous casing, which is a passage member, is crimped with a second flange portion of a housing, which accommodates an electric motor, using a metallic ring, for example. Fluid such as gas and liquid flows through the resinous casing. The housing may be formed of any materials such as resin and metal. When the housing is formed of resin, one annular hooking piece of a pair of annular hooking pieces of the metallic ring may be outsert-molded on one of the first flange portion of the resinous casing and the second flange portion of the housing.

The metallic ring may be outsert-molded to the second resin mold member, instead of the first resin mold member. In this case, the connecting end surface of the first resin mold member is crimped and fixed to the connecting end surface of the second resin mold member.

The above structure and the manufacturing method can be used for any connecting structure, not limited to an electric apparatus.

It should be appreciated that while the processes of the embodiments of the present invention have been described herein as including a specific sequence of processes, further alternative embodiments including various other sequences of these processes and/or additional processes not disclosed herein are intended to be within the processes of the present invention.

Various modifications and alternations may be diversely made to the above embodiments without departing from the spirit of the present invention.

What is claimed is:

1. A manufacturing method for an actuator including a casing and a housing, one of which accommodates a solenoid actuator including a coil configured to axially move a magnetic member when supplied with electricity, the method comprising:

setting a metallic ring in a molding die;
injection molding a first flange portion of the casing using one annular hooking piece of the metallic ring as a part of a surface of the molding die so as to outsert-mold the metallic ring on a molded surface of the first flange portion, the molded surface being opposite to a first connecting end surface of the first flange portion;
engaging the first flange portion with a second flange portion of the housing so as to be opposed to each other;
applying force to bend the metallic ring to form an other annular hooking piece such that the first and the second flange portions are interposed between the one and other annular hooking pieces from both opposite sides in an axial direction, thereby crimping and fixing the first connecting end surface of the casing with a second connecting end surface of the housing.

2. The manufacturing method according to claim 1, wherein the solenoid actuator includes a coil bobbin and a stator core,
the coil bobbin is wound with a wire to construct the coil,
the stator core is arranged in an inner periphery of the coil bobbin,
the stator core includes an attracting portion that is magnetized when the coil is supplied with electricity so that the attracting portion attracts the magnetic member, and
the magnetic member is a moving core that is magnetized when the coil is supplied with electricity so that the moving core is attracted to the attracting portion of the stator core.

3. The manufacturing method according to claim 1, wherein an other of the resinous casing and the housing has a fluid passage, through which fluid flows, and accommodates a valve that is movable to open and close the fluid passage.

4. The manufacturing method according to claim 1, wherein the resinous casing is integrally formed with a portion that has an outer diameter, which is greater than an outer diameter of the first flange portion, and
the housing is integrally formed with a portion that has an outer diameter, which is greater than an outer diameter of the second flange portion.

5. The manufacturing method according to claim 1, wherein the injection molding includes:
heating a resinous material to be in a molten state;
filling the resinous material in the molding die; and
cooling and solidifying the resinous material to mold the casing and outsert-mold the one annular hooking piece on the first flange portion.

6. The manufacturing method according to claim 1, wherein the metallic ring is a connecting member that connects the connecting end surface of the resinous casing with the connecting end surface of the housing in a condition where the one of the annular hooking pieces of the metallic ring hooks to the first flange portion and an other of the pair of the annular hooking pieces hooks to the second flange portion,
the metallic ring includes a cylindrical engaging portion between the annular hooking pieces, and
the cylindrical engaging portion engages with radially outer peripheries of both the first flange portion and the second flange portion.

7. The manufacturing method according to claim 1, wherein the housing has a portion that engages with an inner circumferential periphery of the resinous casing to oppose to a connecting end surface of the solenoid actuator, the portion of the housing includes a taper portion, the inner circumferential periphery of the resinous casing, the connecting end surface of the solenoid actuator, and an outer periphery of the taper portion of the housing form an annular space thereamong, the annular space accommodates an annular elastic member in a condition where the annular elastic member is applied with elastic force, and the taper portion of the housing has the surface, which is slanted for a taper angle, such that the annular elastic member applies elastic force in an axial direction of the housing.

8. The manufacturing method according to claim 1, wherein the casing is in a substantially cylindrical shape, the first flange portion is in a substantially annular shape and arranged on an outer periphery of the casing, and the housing has the second flange portion, which is in a substantially annular shape and arranged on an outer periphery of the housing.

9. The manufacturing method according to claim 8, the coil generates magnetic force when being supplied with electricity, and the magnetic member is magnetized when the coil is supplied with electricity, so that the magnetic member moves in an axial direction of the magnetic member.

10. The manufacturing method according to claim 9, the engaging includes surrounding radially outer peripheries of the first and second flange portions with the metallic ring.

11. The manufacturing method according to claim 1, wherein the crimping force bends the metallic ring into a substantial U-shape having a groove in which said first and second flange portions are disposed with said one and other annular hooking pieces being substantially parallel.

\* \* \* \* \*